(12) United States Patent  
Faria et al.

(10) Patent No.: US 9,302,250 B2  
(45) Date of Patent: Apr. 5, 2016

(54) CATALYSTS FOR RENEWABLE HYDROGEN PRODUCTION FROM OXYGENATED FEEDSTOCKS

(71) Applicant: PHILLIPS 66 COMPANY, Houston, TX (US)

(72) Inventors: Jimmy A. Faria, Bartlesville, OK (US); Jon M. Nelson, Bartlesville, OK (US); Uchenna P. Paul, Bartlesville, OK (US); Danielle K. Smith, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 20 days.

(21) Appl. No.: 14/071,077

(22) Filed: Nov. 4, 2013

(65) Prior Publication Data

US 2014/0134098 A1 May 15, 2014

Related U.S. Application Data

(60) Provisional application No. 61/726,729, filed on Nov. 15, 2012.

(51) Int. Cl.
| | |
|---|---|
| *B01J 23/89* | (2006.01) |
| *C01B 3/02* | (2006.01) |
| *B01J 23/83* | (2006.01) |
| *B01J 23/755* | (2006.01) |
| *B01J 23/78* | (2006.01) |
| *B01J 35/10* | (2006.01) |
| *B01J 21/04* | (2006.01) |

(52) U.S. Cl.
CPC ............ *B01J 23/8946* (2013.01); *B01J 23/755* (2013.01); *B01J 23/78* (2013.01); *B01J 23/892* (2013.01); *B01J 23/894* (2013.01); *B01J 35/1019* (2013.01); *B01J 35/1061* (2013.01); *B01J 21/04* (2013.01); *C01B 2203/0283* (2013.01); *C01B 2203/043* (2013.01); *Y02P 20/145* (2015.11)

(58) Field of Classification Search
CPC ............ Y02P 20/145; C01B 2203/043; C01B 2203/0283; C01B 3/02; B01J 23/8946; B01J 23/83; B01J 23/892; B01J 23/894; B01J 21/04; B01J 35/1061; B01J 23/755; B01J 35/1019; B01J 23/78
USPC ........................................................ 252/373
See application file for complete search history.

(56) References Cited

U.S. PATENT DOCUMENTS

| | | | |
|---|---|---|---|
| 6,361,757 B1 * | 3/2002 | Shikada et al. ............... | 423/651 |
| 7,998,455 B2 | 8/2011 | Abbas et al. | |
| 8,529,865 B2 | 9/2013 | Belt et al. | |
| 2007/0225383 A1 | 9/2007 | Cortright et al. | |
| 2009/0221720 A1 * | 9/2009 | Belt et al. ....................... | 518/700 |
| 2010/0051874 A1 | 3/2010 | O'Connor et al. | |
| 2010/0077655 A1 | 4/2010 | Bauldreay et al. | |
| 2012/0028794 A1 | 2/2012 | Lam et al. | |

OTHER PUBLICATIONS

PCT Notification of Transmittal of the International Search Report and the Written Opinion of the International Searching Authority, or the Declaration, International Filing Date: Nov. 5, 2013, International Application No. PCT/US13/68380, 16 pages.

* cited by examiner

*Primary Examiner* — Stanley Silverman  
*Assistant Examiner* — Syed Iqbal  
(74) *Attorney, Agent, or Firm* — Phillips 66 Company

(57) ABSTRACT

A method of steam reforming where a reaction occurs in which an oxygenated feed contacts a catalyst to produce hydrogen. The catalyst of the reaction comprises a metal/metal promoter on a nickel/transition metal blend catalyst supported on a high-energy lattice metal oxide.

9 Claims, 13 Drawing Sheets

CATALYSTS FOR RENEWABLE HYDROGEN PRODUCTION FROM OXYGENATED FEEDSTOCKS

CROSS-REFERENCE TO RELATED APPLICATIONS

This application is a non-provisional application which claims the benefit of and priority to U.S. Provisional Application Ser. No. 61/726,729 filed Nov. 15, 2012) entitled "Catalysts for Renewable Hydrogen Production from Oxygenated Feedstocks," which is hereby incorporated by reference in its entirety.

STATEMENT REGARDING FEDERALLY SPONSORED RESEARCH OR DEVELOPMENT

None.

FIELD OF THE INVENTION

This invention relates to catalysts for improved renewable hydrogen production from oxygenated feedstocks.

BACKGROUND OF THE INVENTION

Today's refineries use large volumes of hydrogen for hydro-processing applications geared towards clean-fuels production and yield enhancements. Similarly, most biofuels processes require large volumes of hydrogen in order to produce drop-in fuels. In the past, refineries produced hydrogen primarily as a byproduct of catalytic naphtha reforming, a process for producing high-octane gasoline. However, increased processing of sour and heavy crudes, coupled with stricter environmental regulations, have significantly increased refinery hydrogen requirements. Consequently, most refineries today use steam methane reforming (SMR) to provide the supplemental hydrogen. Individual refinery hydrogen demand varies, depending on the crude slate and complexity. Although SMR is a matured technology, it has a significant carbon footprint. An average capacity SMR, 45 million standard cubic feed per day (MMSCFD) of hydrogen, generates around 59 pounds of $CO_2$/thousand standard cubic feed of hydrogen, excluding credits from steam export.

The $CO_2$ emission from the SMR comes from the steam reforming reaction and from the fuel combustion that provides the required heat for the reforming reaction. The fuel consists of natural gas and supplementary off-gas from the pressure swing absorber (PSA) used to separate the hydrogen produced from the other SNIT process effluents. The PSA off-gas mostly consists of $CO_2$ (produced from the steam reforming reaction), CO, slip hydrogen, and un-reacted methane. In this configuration, all of the $CO_2$ from the unit (combustion and steam reforming) exits the process area as part of the flue gas via the furnace stack, where the residual $CO_2$ concentration is relatively dilute. In principle, conventional amine-based scrubber technologies could be employed to capture the $CO_2$ from the SMR. However this process is very expensive.

On the other hand, steam reforming of single or multi-component oxygenated bio-feeds having a molecular formula of $C_xH_yO_z$ (where z/x ranges from 0.1 to 1.0 and y/z ranges from 2.0 to 3.0) could be an alternative source of low carbon hydrogen. However, at relevant reforming conditions, the longevity of conventional Ni-based reforming catalysts is significantly reduced during the reforming of bio-derived oxygenates, primarily due to the rapid formation of carbonaceous deposits.

There exists a need for formulations of relatively inexpensive catalysts that effectively pre-convert bio-derived oxygenates mostly to hydrogen, carbon dioxide, carbon monoxide, and methane with superior coking resistance relative to conventional reforming catalysts.

BRIEF SUMMARY OF THE DISCLOSURE

A method of steam reforming where a reaction occurs in which an oxygenated feed contacts a catalyst to produce hydrogen. The catalyst for the reaction comprises of a metal/metal promoter on a nickel/transition metal blend catalyst supported on a high-energy lattice metal oxide.

In another embodiment a method of steam reforming comprises a reaction where a biomass or a biomass derived stream feed contacts a catalyst to produce hydrogen. The catalyst of this reaction comprises, an Au/K promoter on a Ni/Cu catalyst supported on a modified γ-alumina support with modifying materials.

In yet another embodiment a catalyst is taught comprising a metal/metal promoter on a nickel/transition metal blend catalyst supported on a high-energy lattice metal oxide In one embodiment the method discloses a method of manufacturing a catalyst comprising a metal/metal promoter on a nickel/transition metal blend catalyst supported on a high-energy lattice metal oxide. In this method the manufacturing process comprises incipient wetness impregnation, co-precipitation, ion-exchange or combinations thereof.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

A method of steam reforming where a reaction occurs in which an oxygenated feed contacts a catalyst to produce hydrogen. The catalyst of the reaction comprises a metal/metal promoter on a nickel/transition metal blend catalyst supported on a high-energy lattice metal oxide.

Any conventionally used and/or known SMR system can be used. Generally, SMR processes can be described by two main reactions:

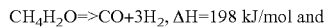

$CH_4 H_2O \Rightarrow CO+3H_2$, $\Delta H=198$ kJ/mol and

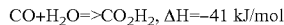

$CO+H_2O \Rightarrow CO_2 H_2$, $\Delta H=-41$ kJ/mol

The first reaction is reforming, while the second is a water-gas shift reaction. Since the overall reaction is endothermic, some heat input is required. Typically, this was accomplished by the combustion of natural gas or other fuels in a direct fired furnace. Our current method utilizes an oxygenated feed as a reactant in the SMR furnace.

Oxygenated chemical compounds are chemicals that contain oxygen as part of their chemical structure. In one embodiment, the oxygenated feed used in this method can be from any biomass or biomass derived stream. As an example different sources of the oxygenates include corn fiber/stover derived aqueous streams, lignin, lignocellulosic biomass, and algae.

The use of an oxygenated feed in a SMR furnace can typically have negative effects such as low hydrogen selectivity, lower rates of water dissociation on the catalyst, and high catalyst deactivation. The current method improves upon these effects.

Figure 1:
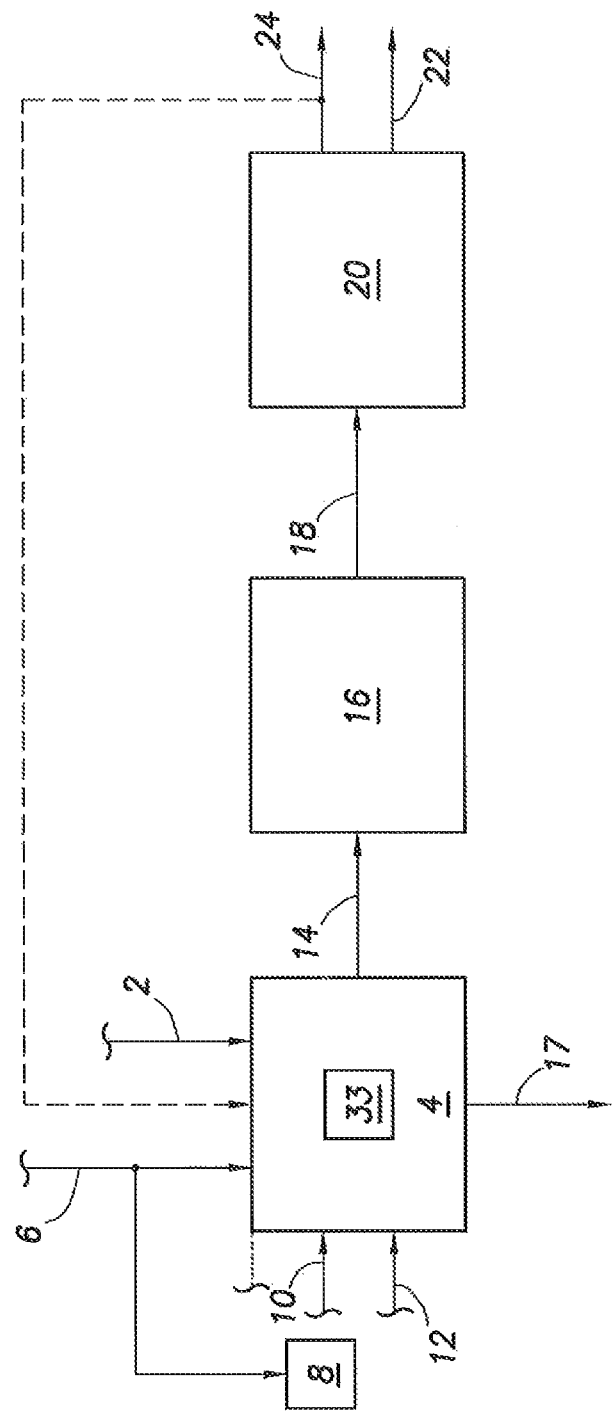
FIG. 1 depicts a representative SMR furnace.

FIG. 1 depicts a representative SMR furnace used in this method wherein an oxygenated teed and steam is passed through catalyst-filled tubes. In this figure air 2 flows into a steam reformer 4 and is used to combust part of the oxygenated feed outside of the reformer tubes. While this figure depicts our method using a feed of solely oxygenated chemical compounds, other typical SMR furnace feeds can be used, either solely or combined with the oxygenated feed. Typical feeds used in SMR furnaces include light hydrocarbons, such as methane, naphtha, butane, natural gas, liquid petroleum gas, fuel gas, natural gas liquids, pressure swing absorber offgas, biogas, or even refinery feedstock.

In some designs the oxygenated feed 6 undergoes contaminants removal to remove contaminants such as sulfur prior to being fed into the steam reformer 4. In FIG. 1, the contaminate removal 8 can remove contaminates to produce a purified oxygenated feed 10. Additionally, steam 12, in this figure, can also be fed into the steam reformer 4.

Inside the steam reformer 4, a catalyst 33 reacts with both the purified oxygenated feed 10 and the steam 12 to produce both effluent gas 14 and flue gas 17. Optionally, the effluent gas 14 can be further reacted in reactor 16 to produce more hydrogen and carbon dioxide. The reaction that takes place in reactor 16 is typically a water-gas shift reaction to produce shifted effluent gas 18.

The shifted effluent gas 18 then undergoes pressure swing adsorption 20 wherein $H_2$ 22, is separated from the other product gases 24 consisting primarily $CO_2$, high BTU fuel gases, and other gases including nitrogen, argon or other chemicals and gases present in the original reaction from the steam reformer 4. A slipstream of these other gases 24 can flow back into the SMR furnace 4.

In our method the catalyst is a nickel/transition metal blend catalyst with a metal/metal promoter supported on a high-energy lattice metal oxide.

In one embodiment the transition metal of the nickel/transition metal blend catalyst is a group 11 metal. In yet another embodiment the transition metal of the nickel/transition metal blend catalyst is copper. In one embodiment the weight percentage of the transition metal ranges from 2.5 wt % to about 45 wt % or even 5 wt % to 36 wt %.

In one embodiment the metal/metal promoter is an alkali metal/transition metal promoter. In one embodiment the alkali metal of the alkali metal/transition metal promoter is a group 1 metal such as potassium. In another embodiment the transition metal of the alkali metal/transition metal promoter is gold. In other embodiments the metal/metal promoter is K/Ni or Au/Ni. In other embodiments the metal/metal promoter has just one metal promoter such as potassium. In one embodiment the weight percentage of the promoting metals ranges from 0.05 to 1.5 wt % or even 0.1 to 1 wt %

In one embodiment the high-energy lattice metal oxide support is a modified γ-alumina support ($Al_2O_3$) with modifying materials. The modifying materials can be MgO, $CrO_2$, $CeO_2$ or $ZrO_2$. In one embodiment the mass ratio of the modified γ-alumina support to modifying materials ranges from 1.0 to 7.0 or even 2.0 to 6.0

The catalyst can be formed by any conventionally known method of forming catalysts. Methods of forming the catalyst include incipient wetness impregnation, co-precipitation, and ion-exchange or a combination of these methods.

The following examples of certain embodiments of the invention are given. Each example is provided by way of explanation of the invention, one of many embodiments of the invention, and the following examples should not be read to limit, or define, the scope of the invention.

Example 1

A Compound A catalyst was made with 26 wt % Ni, 10 wt % Cu on a support of 54 wt % γ-$Al_2O_3$ modified with 10 wt % of MgO. A Compound B catalyst was made with 13 wt % Ni, 5 wt % Cu on a support of 77 wt % γ-$Al_2O_3$ modified with 5 wt % of MgO. A Compound C catalyst was made with 26 wt % Ni, 10 wt % Cu with a 1 wt % K on a support of 53 wt % γ-$Al_2O_3$ modified with 10 wt % of $CeO_2$. Table 1 depicts the mesopore diameters and the BET surface areas of these catalysts.

TABLE 1

| Catalyst | BET Surface Area (m²/g) | Mesopore diameter (nm) |
|---|---|---|
| Compound A | 124.37 | 12.59 |
| Compound B | 162.82 | 14.3 |
| Compound C | 130.07 | 31.36 |

In one embodiment the BET surface areas of the catalysts are greater than 50 m²/g 100 m²/g or as described by the tests above greater than 124.37 m²/g.

Example 2

Figure 2:
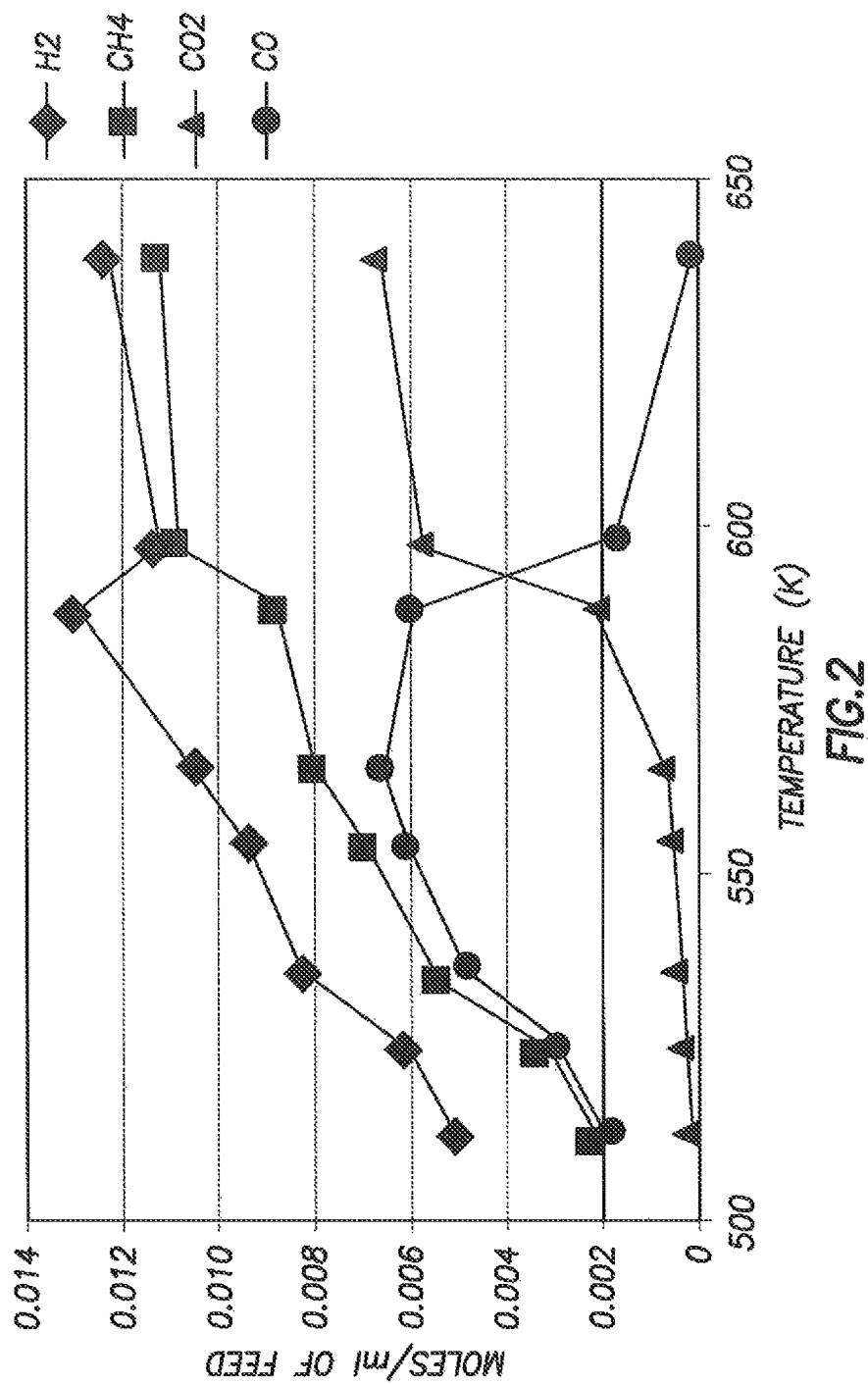
FIG. 2 depicts a species molar production rate versus temperature during ethanol pre-conversion for catalyst Compound A.

In this example Compound A was used to pre-convert ethanol. In this test 7000 ml of ethanol was flowed over a catalyst bed containing Compound A. As shown in FIG. 2, a steady production of $H_2$ at temperatures of 650K or 376° C.

Figure 3:
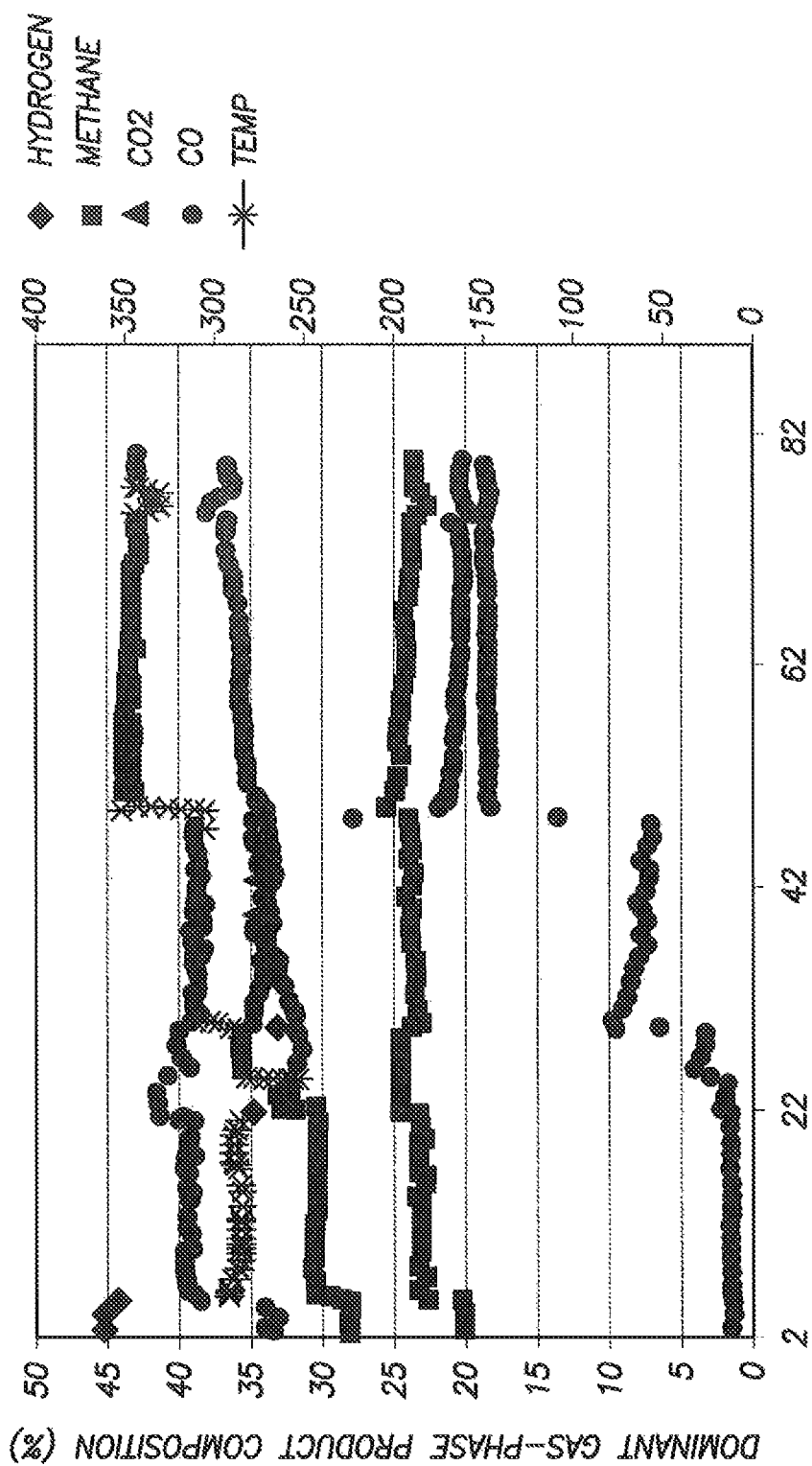
FIG. 3 depicts the temperature and composition of dominant gas-phase products during the pro-conversion of ethanol over Compound B.

As part of this test Compound B was also used to pre-convert ethanol. In this test 600 ml of ethanol was flowed over a catalyst bed containing Compound B. FIG. 3 shows the temperature and dominant gas-phase product composition (which included $H_2$, methane, carbon dioxide, and carbon monoxide) as a function of time on stream.

Figure 4:
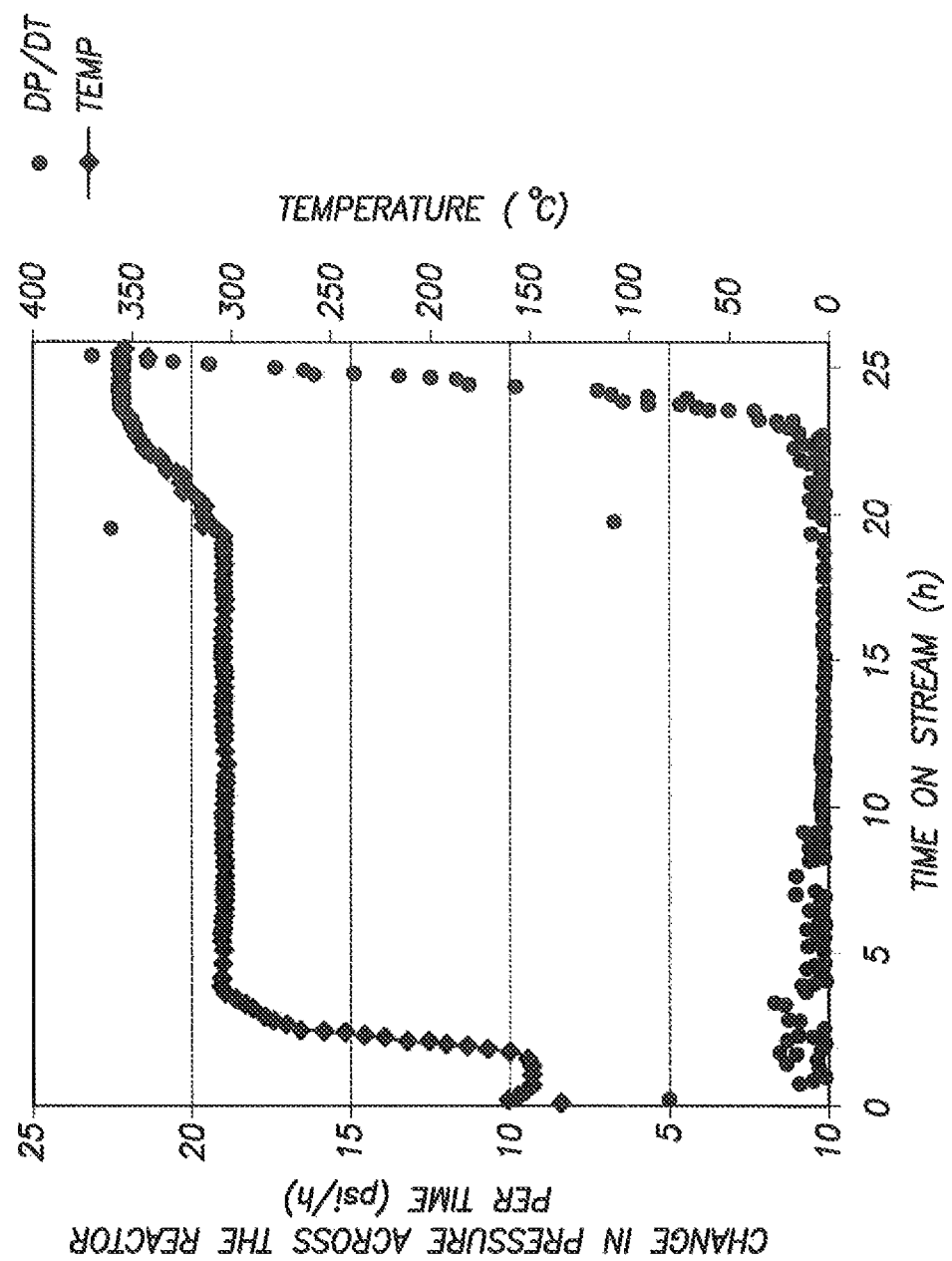
FIG. 4 depicts the reactor pressure drop over time of ethanol over a commercial catalyst.
Figure 5:
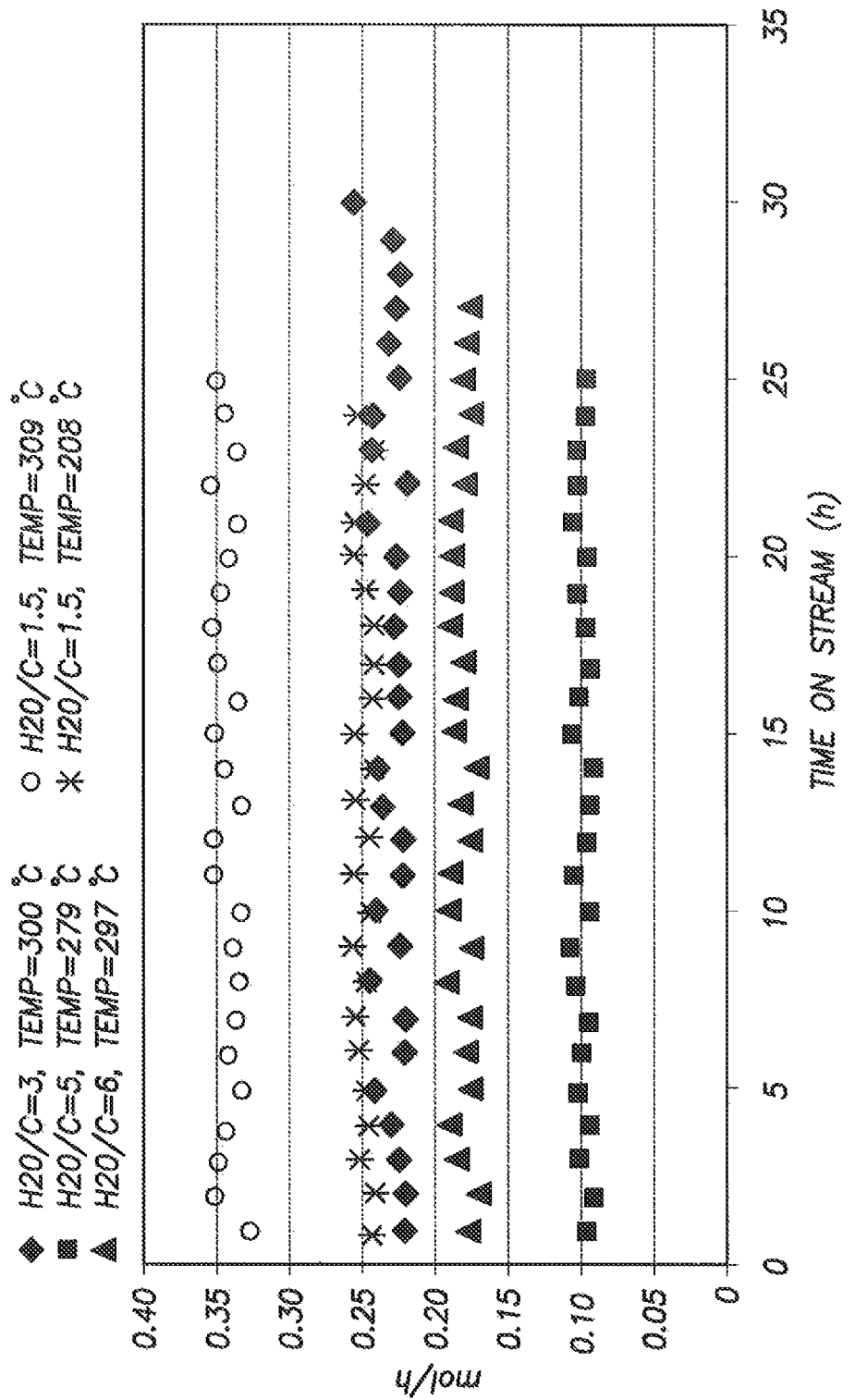
FIG. 5 depicts a species hydrogen production as a function of time on stream during the pre-conversion of a bio-derived oxygenate for catalyst Compound D.
Figure 6:
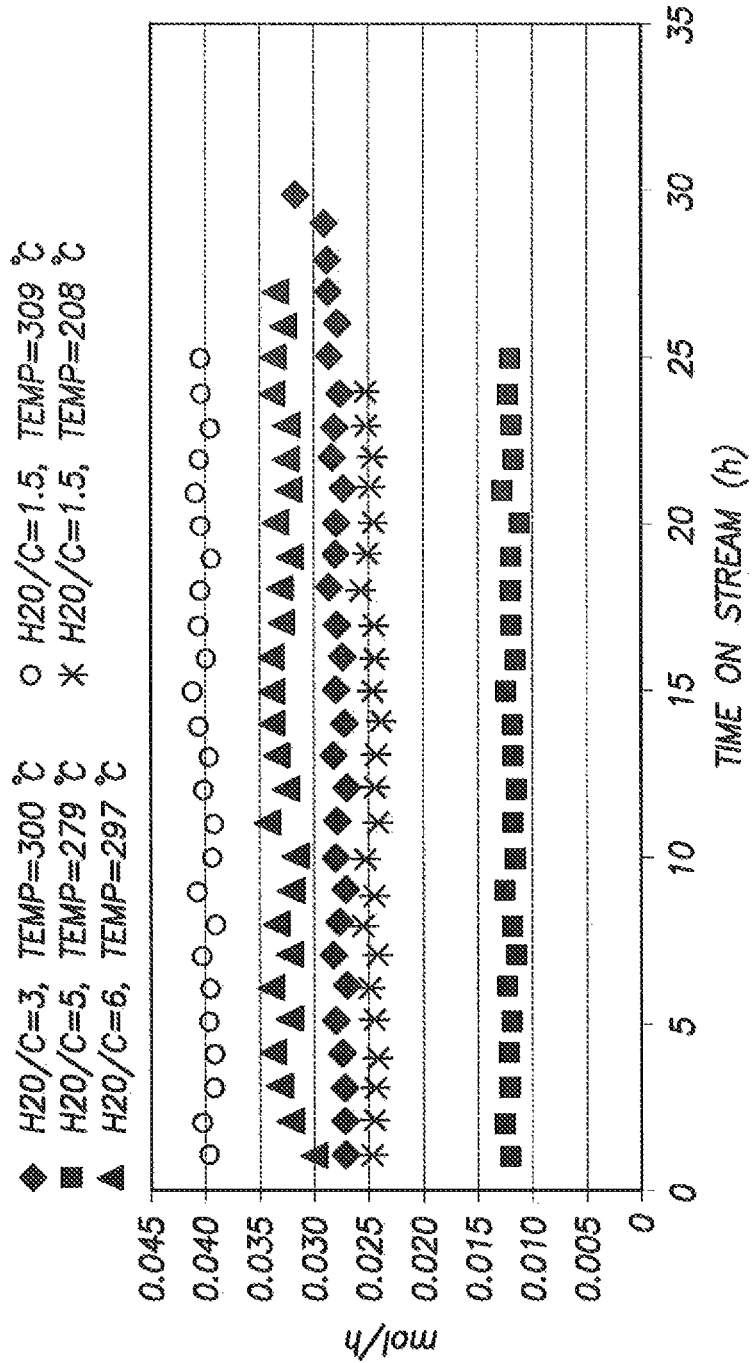
FIG. 6 depicts a species carbon dioxide production as a function of time on stream during the pre-conversion of a bio-derived oxygenate for catalyst Compound D.
Figure 7:
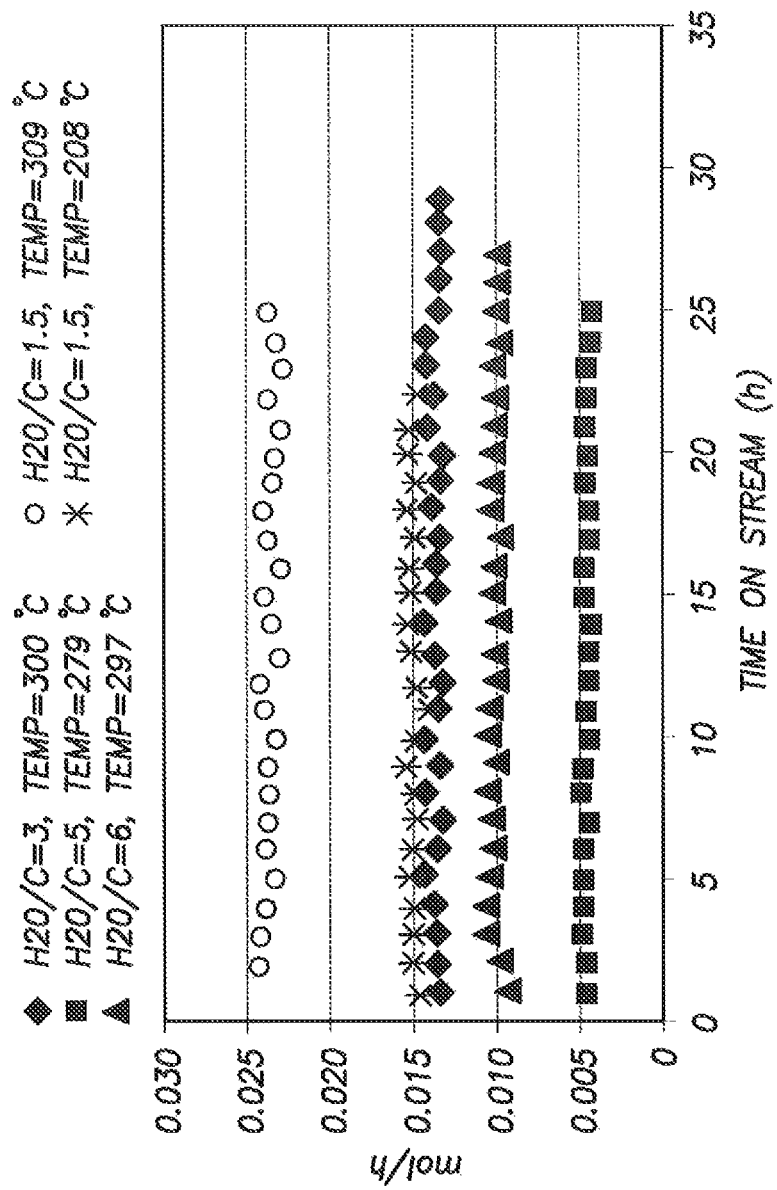
FIG. 7 depicts a species methane production as a function of time on stream during the pre-conversion of a bio-derived oxygenate for catalyst Compound D.
Figure 8:
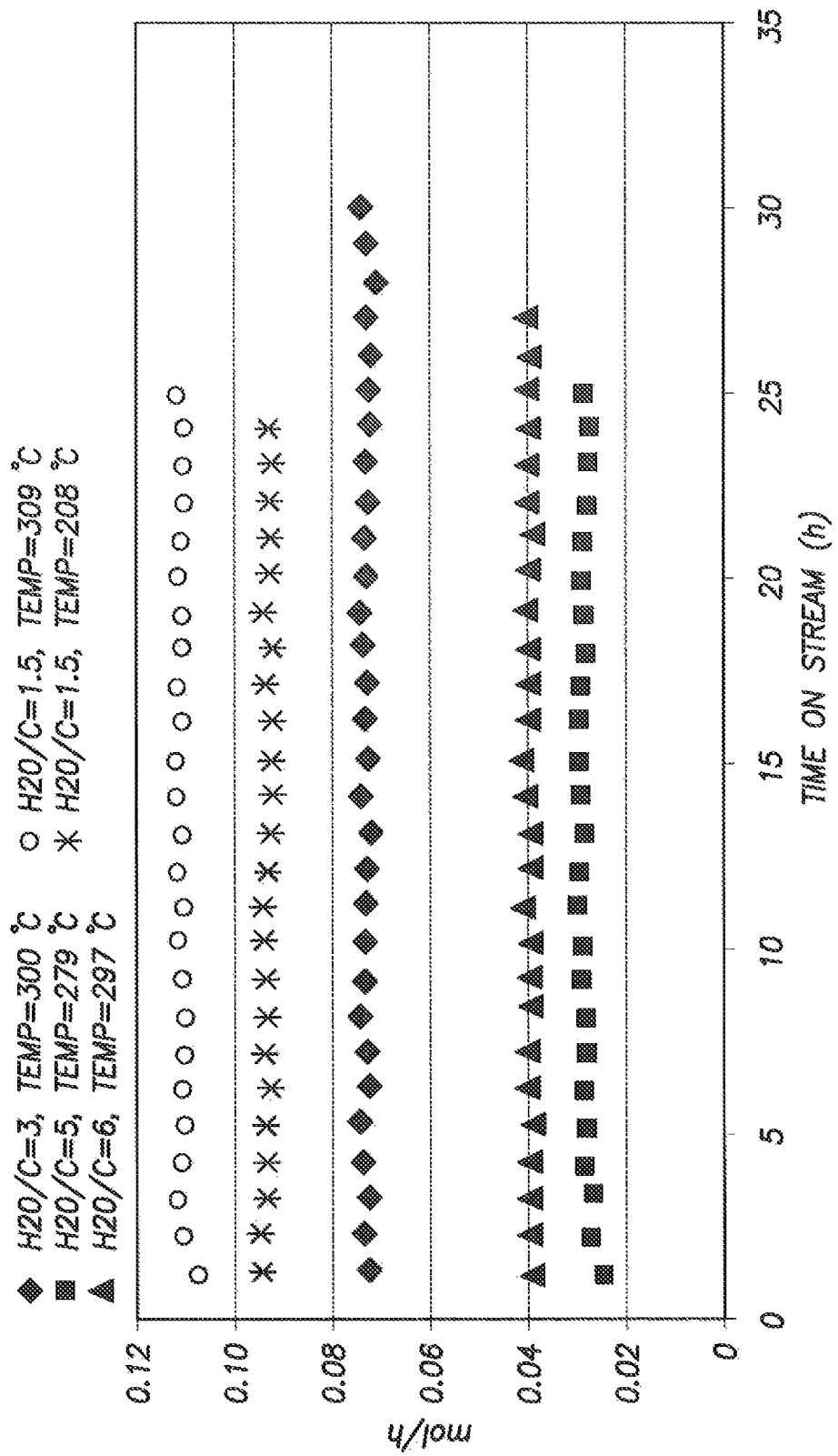
FIG. 8 depicts a species carbon monoxide production as a function of time on stream during the pre-conversion of a bio-derived oxygenate for catalyst Compound D.

As a comparison, a commercially available nickel based reforming catalyst, HiFuel™, (available from Alfa Aesar) was used to pre-convert ethanol at 100 psig pressure. After about 19 hours of stream time, the reactor temperature was increased from 300° C. to 350° C. While at this temperature, the pressure across the reactor began to increase rapidly at a rate as high as 24 pounds per square inch per hour (see FIG. 4) at which time only about 204 mL of ethanol have been processed over the catalyst. At this point, the test had to be discontinued because of the excessive pressure-drop across the reactor, arising from rapid coking on the catalyst. Thereafter the spent catalyst was sectioned into four zones for which a post-mortem analysis of the spent catalyst, using temperature programmed oxidation in a thermogravimetric analyzer (TGA), showed 0.32 g of coke per gram of catalyst for the inlet zone of the bed and 0.07, 0.06, and 0.07 g of coke per grain of catalyst in the other three zones.

Example 3

In this example a Compound D catalyst was made with 26 wt % Ni, 10 wt % Cu, 1 wt % K, 1 wt % Au on a support of 47 wt % $\gamma$-$Al_2O_3$ modified with 15 wt % of $CeO_2$. Compound D was then used to convert a mixture of bio-derived oxygenates at different steam-to-carbon ratios. The constituents of the bio-derived oxygenates are described in Table 2.

TABLE 2

| Component | wt % |
|---|---|
| Methanol | 61.96 |
| Water | 24.5 |
| Ethanol | 6.09 |
| 2-Propanol | 5.05 |
| 1-Propanol | 0.77 |
| Other Oxygenates | 1.62 |
| Propylene Glycol | 0.01 |

FIG. 5 to FIG. 8 show the different hydrogen (FIG. 5), methane (FIG. 7), carbon monoxide (FIG. 8) and carbon dioxide (FIG. 6) molar production rates at different temperatures and steam-to-carbon ratios as a function of time on steam during the pre-conversion of the bio-derived oxygenates over Compound D. As demonstrated in the figures there is minimal coking loss at a steam to carbon ration ranging from 1.5 to 5.0.

Example 4

Figure 9:
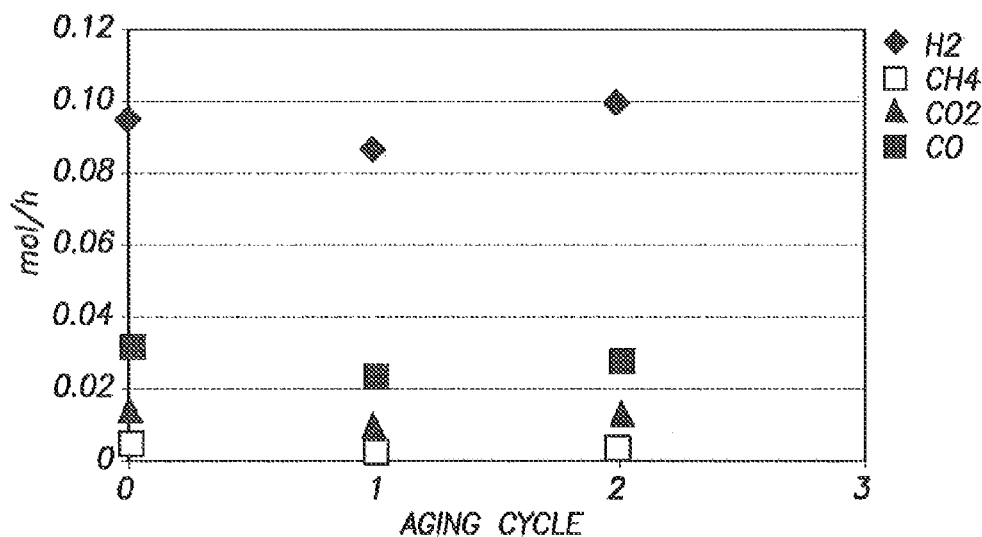
FIG. 9 depicts the production rates of hydrogen, methane, carbon dioxide and carbon monoxide at 270° C. after two aging cycles for catalyst Compound D.

In this example Compound D from Example 3 was subjected to a four day aging cycle consisting of a first cycle at 315° C. and 209 psi and a second cycle of 350° C. at 209 psi. The bio-derived oxygenates of Example 3 were then flowed over the aged Compound D at 270° C. to determine any changes in catalytic activity. FIG. 9 shows the production rates of hydrogen, methane, carbon dioxide and carbon monoxide at 270° C. after two aging cycles.

Example 5

Figure 10:
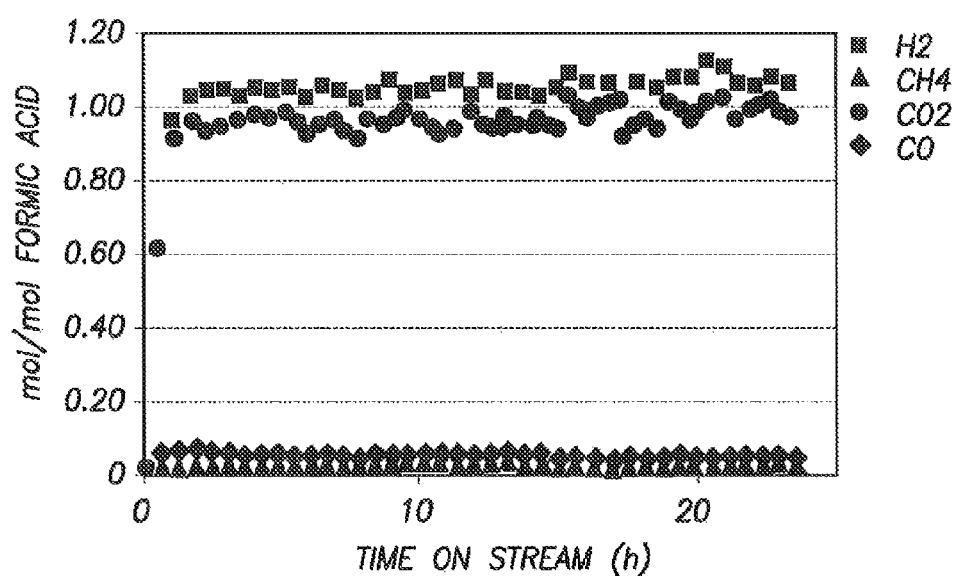
FIG. 10 depicts the production rates of methane, carbon dioxide and carbon monoxide for catalyst Compound E.

In this example a Compound E catalyst was made with 26 wt % Ni, 10 wt % Cu, 1 wt % K, 1 wt % Au on a support of 52 wt % $\gamma$-$Al_2O_3$ modified with 10 wt % of $CeO_2$. Compound E was then used to convert formic acid for 24 hours. This resulted in the formation of hydrogen and carbon dioxide as shown in FIG. 10.

Example 6

Figure 11:
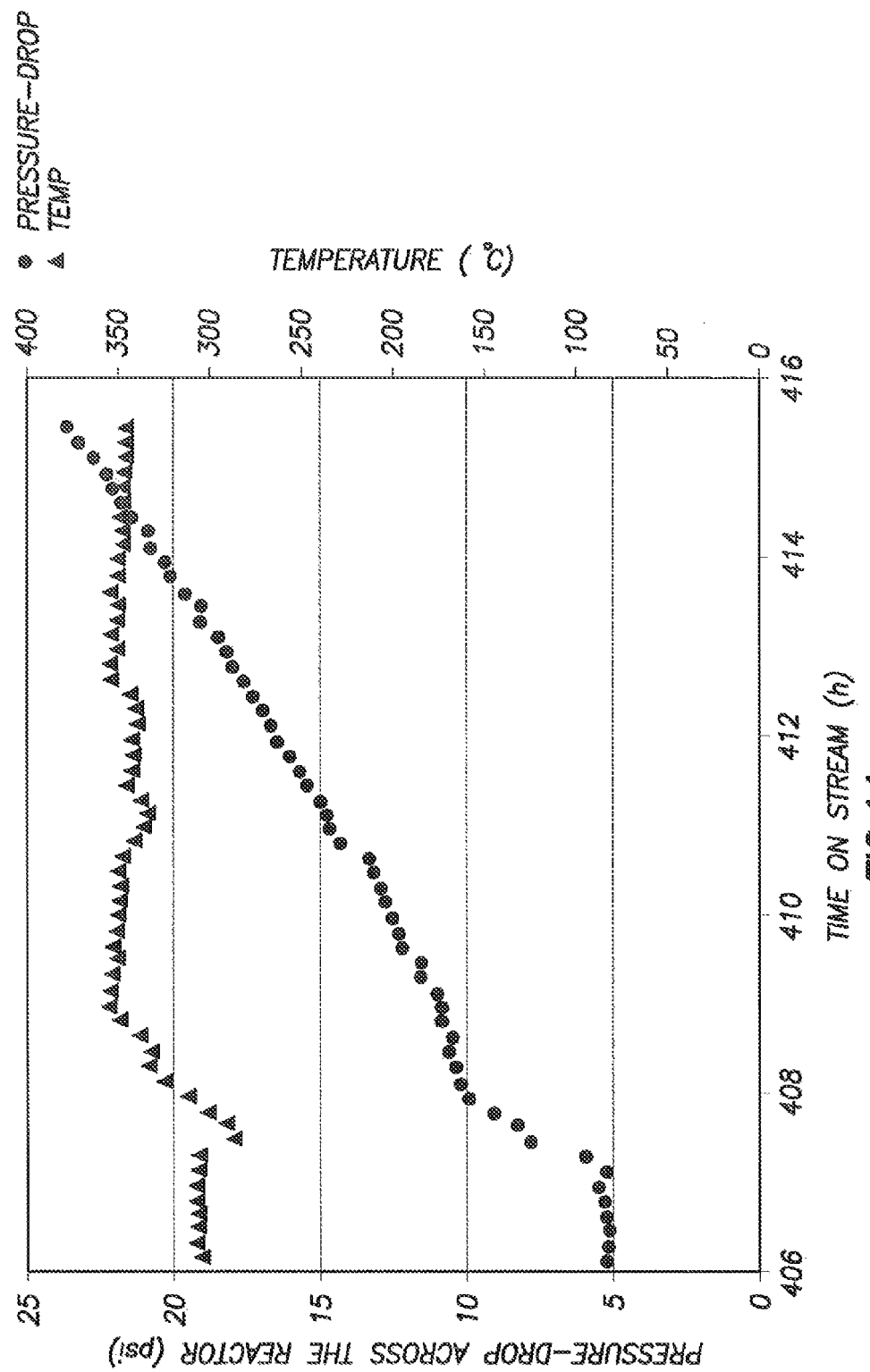
FIG. 11 depicts the reactor pressure drop over time of ethanol over Compound B.

In this example a Compound F catalyst was made with 26 wt % Ni and 10 wt % Cu on a 67 wt % unmodified alumina support. Compound F was then used to pre-convert ethanol at 100 psig pressure and 250 to 350° C. However, after processing 1174 ml of ethanol, the test had to be discontinued due to excessive pressure-drop (see FIG. 11) due to coking on the catalyst. The total stream time was 415 hours less idle times during weekends.

Example 7

Figure 12:
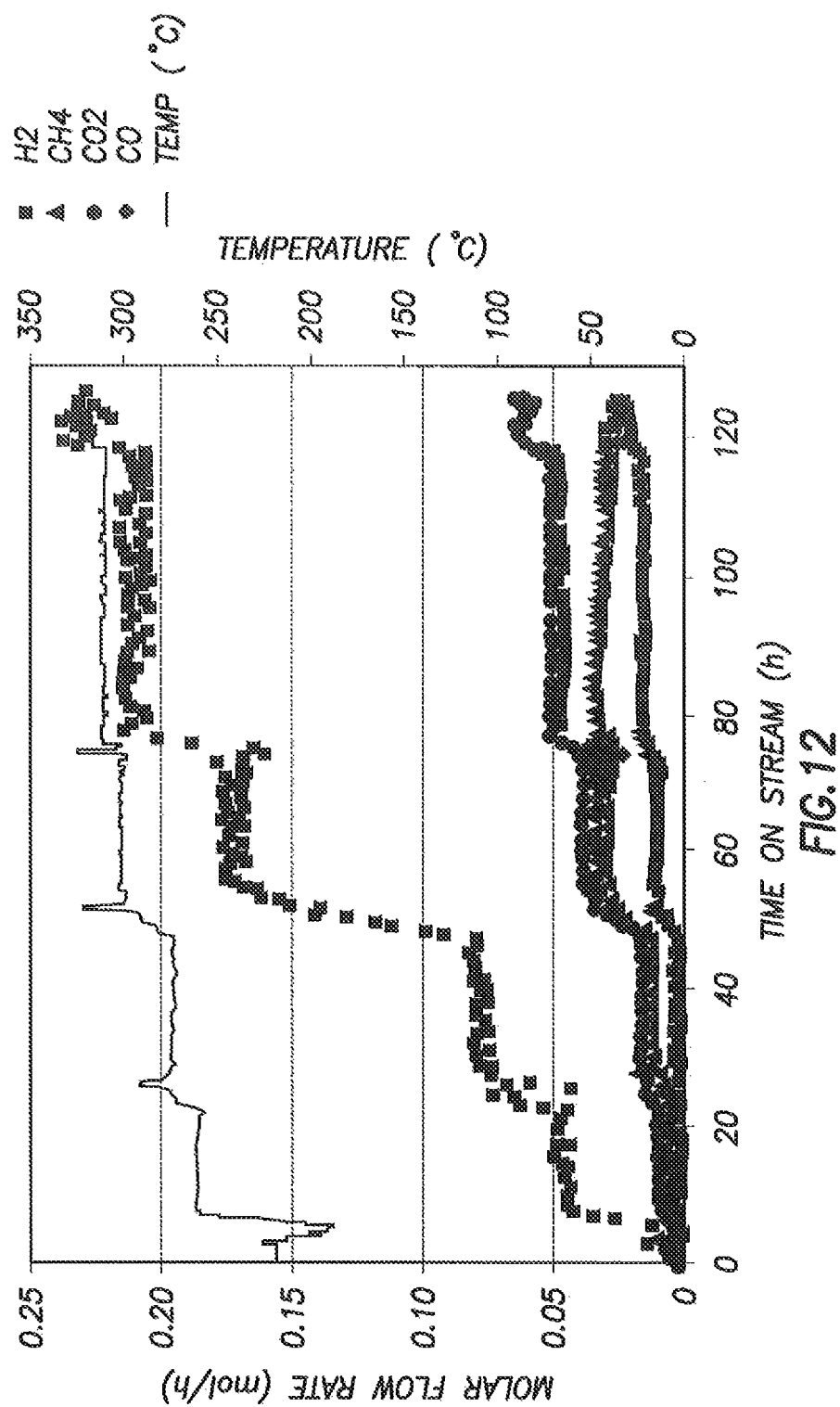
FIG. 12 depicts the ability of catalyst Compound G to produce hydrogen without any coking effects after 130 hours on a mixture of bio-derived oxygenates.

In this example a Compound G catalyst was made with 26 wt % Ni, 10 wt % Cu, 1 wt % K, Au on a support of 62 wt % $ZrO_2$ modified with 15 mol % of Ce. A mixture of bio-derived oxygenates was then flowed over the catalyst bed for 130 hours as shown in FIG. 12. FIG. 12 clearly shows the ability of Compound G to continue to produce hydrogen without any coking effects.

Figure 13:
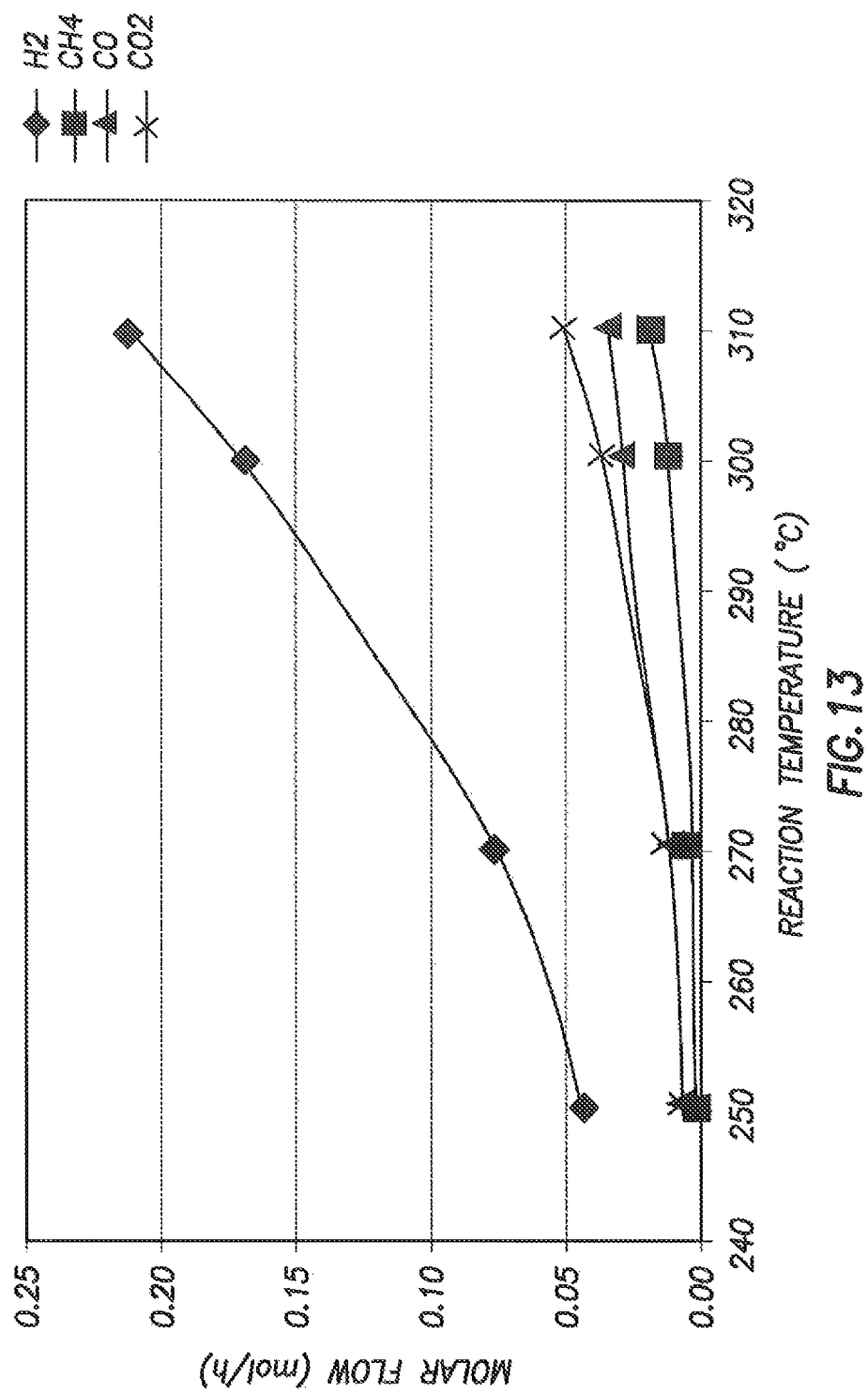
FIG. 13 depicts the average molar flow rate of a mixture of bio-derived oxygenates over a catalyst Compound G.

In addition, the average molar flow rate of hydrogen, methane, carbon monoxide, and carbon dioxide was also calculated with a mixture of bio-derived oxygenates flowing over Compound G. As shown in FIG. 13, the hydrogen production has a selectivity above 50%, 60%, 70% and is around 75%.

Example 8

Figure 14:
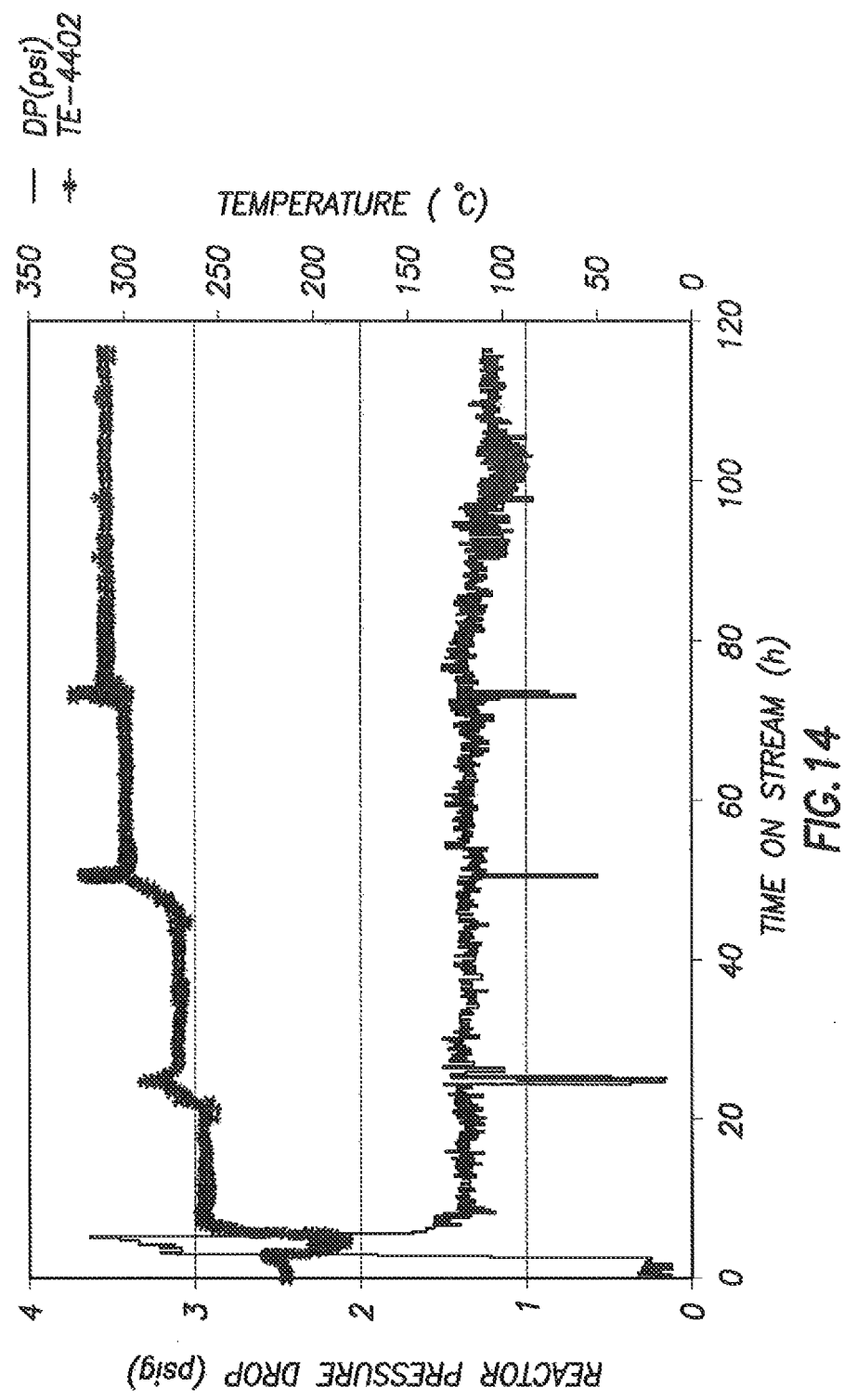
FIG. 14 depicts the reactor pressure drop over time on a mixture of bio-derived oxygenates over catalyst Compound G.

A reactor pressure drop was calculated between Compound G of Example 8 and HiFuel™ (available from Alfa Aesar) As shown in FIG. 14 as the time on stream increased the reactor pressure drop increased significantly as time progressed In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. An endothermic method of steam reforming, comprising:
   conducting a reaction in which an oxygenated feed contacts a catalyst to produce hydrogen;
   wherein the catalyst comprises a metal/metal promoter on a nickel/transition metal blend catalyst supported on a high-energy lattice metal oxide, wherein the metal/metal promoter is K/Ni.

2. The method of claim 1, wherein the oxygenated feed is biomass or a biomass derived stream.

3. The method of claim 1, wherein the transition metal of the nickel/transition metal blend catalyst is copper.

4. The method of claim 1, wherein the high-energy lattice metal oxide is a modified γ-alumina support (Al2O3) with a modifying material.

5. The method of claim 4, wherein the modifying materials are selected from the group consisting of MgO, CiO2, CeO2 and ZrO2.

6. The method of claim 1, wherein the mass ratio of the nickel/transition metal blend ranges from 1.0 to 10.0.

7. The method of claim 1, wherein the mass ratio of the metal/metal promoter ranges from 0.0 to 0.067.

8. The method of claim 4, wherein the mass ratio of the modified γ-alumina support with the modifying materials ranges from 2.0 to 6.0.

9. An endothermic method of steam reforming, comprising:
   conducting a reaction in which a biomass or a biomass derived stream feed contacts a catalyst to produce hydrogen;
   wherein the catalyst comprises an Au/K promoter on a Ni/Cu catalyst supported on a modified γ-alumina support with a modifying material.

* * * * *